Nov. 11, 1924.
H. S. ARNOLD ET AL
1,515,324
ELECTRICAL DISTRIBUTION
Filed Dec. 29, 1923  2 Sheets—Sheet 1
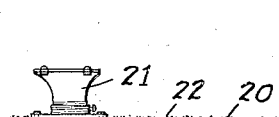
Fig.1.
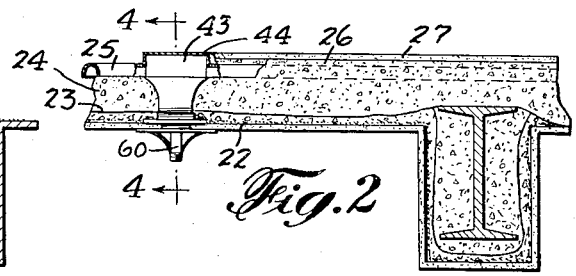
Fig.2.
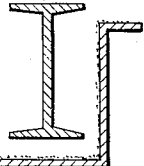
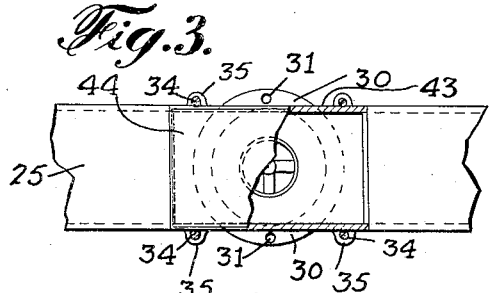
Fig.3.
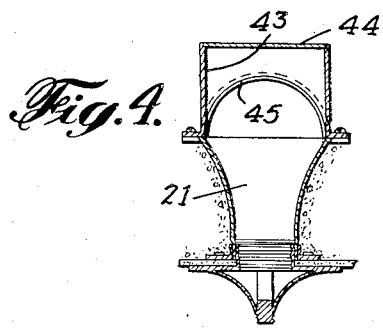
Fig.4.
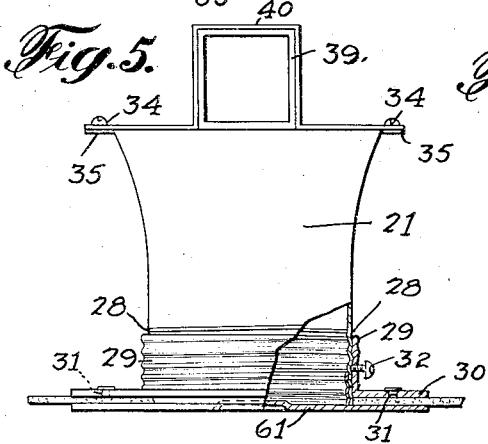
Fig.5.  Fig.8.
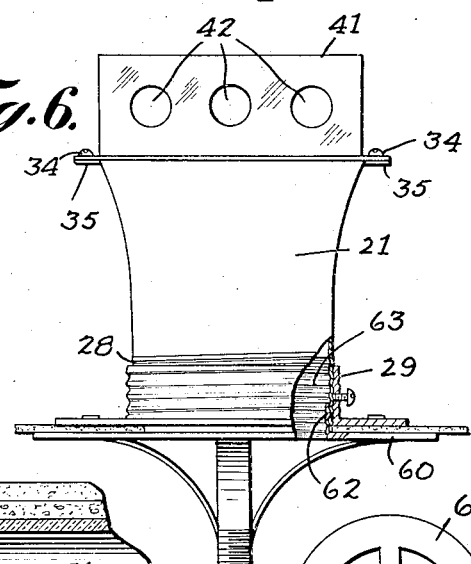
Fig.6.  Fig.7.
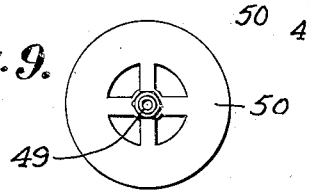
Fig.9.
Inventor
HARRY S. ARNOLD
RAY C. WILSON
By Philip S. McLean, Attorney

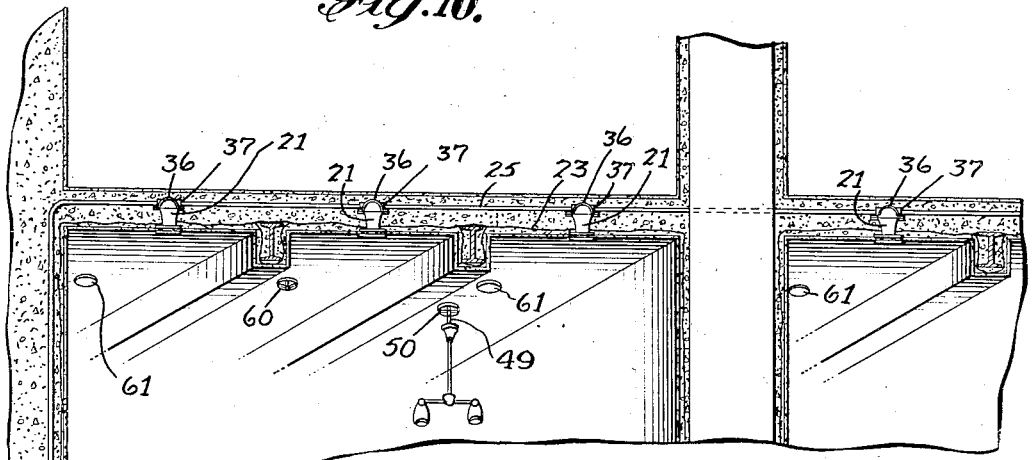
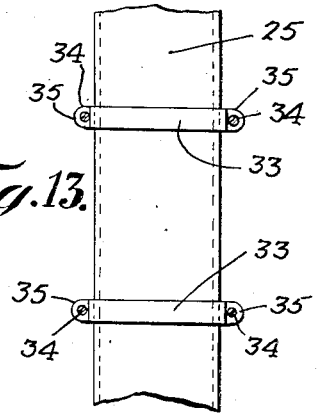
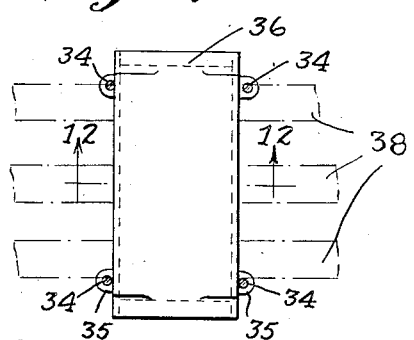
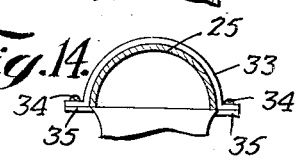
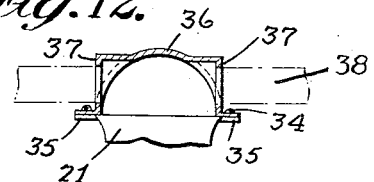
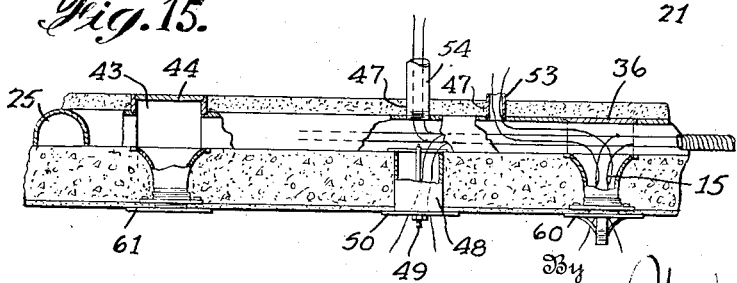

Patented Nov. 11, 1924.

1,515,324

UNITED STATES PATENT OFFICE.

HARRY S. ARNOLD, OF BROOKLYN, AND RAY C. WILSON, OF NEW YORK, N. Y.

ELECTRICAL DISTRIBUTION.

Application filed December 29, 1923. Serial No. 683,307.

*To all whom it may concern:*

Be it known that we, HARRY S. ARNOLD, a citizen of the United States, and a resident of Brooklyn, Kings County, and State of New York, and RAY C. WILSON, a citizen of the United States, and a resident of the city, county, and State of New York, have invented certain new and useful Improvements in Electrical Distribution, of which the following is a specification.

This invention relates particularly to flexible electric wiring systems of the overhead or ceiling outlet type disclosed in our Patent 1,480,587, in which wire raceways or conduits are embedded in the ceiling slab and outlets are provided therefrom opening downwardly through the ceiling and giving full access for all overhead wiring purposes.

The objects of the invention are to make it possible to effect the wiring operations at the floor, as well as the ceiling and to accomplish a practical combination of under-floor and overhead wiring by which substantially any desired distribution and outlet requirements can be quickly and inexpensively met.

The foregoing and other objects are attained through certain special novel features of construction, combination and relation of parts, embodiments of which are illustrated in the accompanying drawings forming a part of the specification.

Figures 1 and 2 are broken sectional views illustrating first the setting of outlet ceiling fixtures, fittings or outlet boxes on the wooden ceiling forms followed by the laying of the connecting raceways and embedding the whole in the slab.

Figure 3 is an enlarged broken plan view of one of the outlet fixtures and parts of the connecting raceways.

Figure 4 is an enlarged cross sectional view of one of the fixtures, fittings or outlet boxes on substantially the plane of line 4—4 of Figure 2.

Figures 5 and 6 are further enlarged part sectional views of one type of outlet fixture, fittings or outlet box showing different forms of covers designed for steel duct and rigid pipe conduit respectively.

Figure 7 is a bottom plan view of the fixture supporting ceiling plate which forms the closure for the lower end of the outlet box.

Figure 8 is a broken sectional view showing one of the intermediate outlet installations.

Figure 9 is a bottom plan view of the ceiling plate used with this installation.

Figure 10 is a broken perspective and sectional view of a typical embodiment of the system as installed in a building of modern construction.

Figure 11 is a plan view showing a special form of cover which can be used with ceiling outlet fixtures to enable cross connecting lines of rigid conduit to be tied in with raceways.

Fig. 12 is a cross sectional view of the same as on substantially the plane of line 12—12 of Figure 11.

Figures 13 and 14 are broken plan and end views respectively illustrating the covering of the outlet fixtures with the conduit or raceway itself, here shown as of the half-round type held in place over the fixture by cross straps.

Figure 15 is a broken sectional view illustrating further variations in the possibilities of the combined overhead and under-floor distributing system.

Figures 1 and 2 illustrate successive steps in the installation of the system in a combined ceiling and floor slab structure. After the wooden form 20 for the slabs is in place, the boxes or body portions 21 of the outlet fixtures are positioned in the desired locations and secured directly on the form. The slab is then built up in the usual way, for instance, by pouring a first coating 22 over the form, then laying a reinforcement 23 and after that, casting the body 24 of the slab. The box body is made of a height and positioned so that its upper end will stand substantially flush with the top of the slab and a temporary flat cover may be applied over the open upper end of the box during the pouring of the concrete. Thus, with the hardening of the concrete, the box bodies become fixed in the body of the slab with their upper ends substantially on a level with the top of the slab and so are fully exposed and accessible for the conduits or wire raceways which can be laid directly on top of the slab, connecting the various outlets.

The form of the raceway may vary, according to different requirements. One type which may be preferred for general purposes is of trough shape, substantially half-round in cross section, as indicated at 25. This conduit may be laid directly on top of the slab, open side down, in position connecting the various outlets, after which the so-called fill 26 may be poured and on top of that, the finish coating 27. The connecting sections of conduit thus also become embedded and anchored in the completed slab structure.

In order that the box bodies may always be set at the necessary or desired level, they are shown as having an external screw-thread 28 rolled or otherwise formed in the lower ends of the same to receive correspondingly threaded positioning collars 29 which have outstanding flanges 30 to rest upon the forms, perforated as at 31 to receive nails or screws for positioning and holding them against rotation on the forms. These positioning collars may also have set screws as indicated at 32 for securing the box bodies in their adjusted positions.

With the construction described, the supporting collars may be first secured in proper position on the forms and the box bodies be then entered in the same and turned down to the proper level and faced in the proper direction to take the lines of conduit which are to be later applied. After these vertical and rotary adjustments are made the set screws may be tightened to prevent any shifting of the boxes during the subsequent pouring operations.

The boxes are shown as open at the top to the full width of the half-round conduit and as having convergent sides tapering downwardly to smaller sized outlets at the ceiling level. This construction provides the greatest facility for wiring, enabling the wires to be drawn out or pushed in through the ceiling outlets or to be fed through the conduits past or beyond the outlets. The conduit itself may be used to cover over the upper ends of the boxes, or covers of special construction may be provided, according to different requirements. Where the conduit is used for the purpose, as shown in Figures 13 and 14, the same may be secured in position over the open box by a cross strap or straps 33 secured by fastening screws 34 engaged with screw lugs 35 extended from the upper edges of the box.

In Figure 15 a half-round form of box cover is shown at 36 secured in the same manner as the straps and having arched entrances at its opposite ends to receive the ends of two adjoining sections of the half-round conduit. A modification of these half-round covers is illustrated in Figures 10, 11 and 12 where they are shown as having flattened sides 37 perforated to take the ends of rigid pipe conduit 38 which may be used for carrying the service wires into the lines of distribution conduits.

Where rectangular steel duct is used for the distribution conduit such as illustrated at 39 in Figure 5, the box covers may be constructed as indicated in this view with a correspondingly rectangular shaped archway 40 receiving the adjoining ends of such conduit. Where rigid conduit only is used the box covers may be constructed as in Figure 6, that is, as an upturned rectangular sided shallow box 41 having knock-outs 42 or openings for the conduit preferably in all four sides of the same.

To make the service available at the floor level as well as the ceiling and facilitate the connecting-in of circuits at both places, the special type of cover illustrated in Figures 2, 4 and 15 may be employed, the same consisting of an open box body 43 applied to the top of the ceiling box and extending up to the floor level, where it is provided with a detachable floor plate 44. This special floor box body is shown as having portals 45 in the opposite sides of the same for the half-round conduit sections so as to provide the desired continuity of the wire raceway and at the same time provide an outlet by which the wiring service may be extended up through the floor. This special construction also, it will be observed, enables wiring to be extended straight through from the ceiling below to the floor above, or vice versa, and greatly facilitates the operations of feeding wires into or drawing wires out of the conduit either from above or below the slab or in cases of necessity, from both points at once.

The ceiling or combined ceiling and floor outlets described are usually located at predetermined intervals in the system, the spacing depending on the possible uses of the conduit, location of furniture, etc., but where the need arises, outlets may be provided from the conduit system at points intermediate these fixed outlets.

These intermediate outlets which enable the full utilization of the system may be taken either through the ceiling or up through the floor, as indicated in Figures 8 and 15. The first is effected by cutting an opening 46 from the ceiling up through the floor slab directly into the wire raceway and the second, by cutting an opening 47 down through the floor into the top of the raceway, the floor and ceiling outlets disclosing the lines on which the conduits run and making it possible to easily drive these openings accurately either into the top or the under side of the raceways.

In drilling up through the slab for the extra ceiling outlets, the walls of the opening made be more or less rough and for this reason it is usually desirable to protect the wiring from the rough edges and sharp corners by means of a liner 48 slipped up into the hole and this liner may be supported in position by a toggle bolt like that shown at 49 adapted to carry a lighting fixture or the like and supporting a ceiling plate 50 which directly engages the lower end of the liner. The toggle bolt illustrated is of a well-known type carrying pivoted arms 51 at its upper end which fold down at the sides of the bolt shank when the same is inserted up through the opening and then straighten out into engagement over the bottom of the raceway, where they are locked in this supporting position by a key 52. The fixture or other outlet device is supported by direct engagement with the lower extended end of the toggle bolt, the weight being transmitted by said bolt directly to the top of the ceiling slab and the ceiling plate 50 provides the necessary finish by cooperating with the canopy or base portion of the fixture. The extra floor outlets may be lined as by means of a bushing 53 or pipe section 54 screwed into the top of the wire raceway, through which the wires may be drawn, as indicated.

By driving the floor outlets down into the conduit directly over the ceiling outlets, advantages are gained in the drawing of the wires and connecting the fixtures as will be evident from the example illustrated at the center in Figure 15. In such a case, by working at the most convenient side of the slab or from both sides of the slab, the splices with the feed wires may be made either at the ceiling or at the floor level, the wiring being usually partly withdrawn from the conduit during such operation and then pushed back into place.

A particularly important feature of the invention is that the system can be installed during the construction of a building without interfering with the structural work. The outlet fixtures either for ceiling or floor or both may be spaced at regular or irregular distances, depending upon special requirements which have to be met by the architect. And where extra outlets become desirable, either at the floor or ceiling levels, these can be easily and inexpensively provided by simply cutting into the wire raceways at the desired points. The tapping of the feed wires is in many instances facilitated by extending the outlet wires back through the conduit to the nearest regular outlet box and making the splices at this box, substantially after the manner indicated at 55 in Figure 15. This and the foregoing features of flexibility makes it possible to meet practically any wiring problems that may arise.

The ceiling outlet fixtures which are put in at the time of installing the system are closed off at their lower ends by suitable ceiling plates, as shown particularly in Figures 5 and 6. Where a chandelier or other fixture is to be installed, this ceiling plate may be constructed as shown at 60 in Figure 6; that is, with a central stud to be engaged by the fixture stem and a wide ceiling flange to be engaged by the canopy of the fixture and to provide a proper joint between the fixture and ceiling. If the outlet is not to be put into use at once, the same may be closed off by a simple cover plate such as shown at 61 in Figure 5. Both these forms of closures are shown as connected with the mouth of the outlet fixture by an upstanding screw-threaded neck 62 engaged in the internally screw-threaded lower end 63 of the outlet fixture. This method of connection enables ready interchangeability of the different forms of closure plates and enables these closures or ceiling plates being adjusted with respect to the outlet boxes to make the desired close fit with the ceiling.

The wire raceways being continuous and accessible throughout their length from either the floor level or the ceiling side of the slab and being "oversize" in the sense that they are capable of freely carrying a considerably greater number of wires than would ordinarily be considered necessary in the original planning of the structure or in a non-flexible wiring system, with the ceiling outlets opening up into the full interior of the raceway and the floor outlets opening downwardly into the raceway will be seen to provide a completely flexible system which can be quickly tapped either from above or below at any points intermediate the originally installed ceiling or floor outlets and one in which the wiring may be easily fished through these tapped outlets either from the floor or from the ceiling as may be most convenient. In many cases, most or all of the fishing operations may be carried on at the floor level which is a great advantage in the saving of time and trouble.

The raceway can be tapped at any time for the addition of as may extra floor or ceiling outlets as required without in anyway marring or destroying the original architectural features of the structure and at comparatively slight expense.

While we have disclosed herein various practical embodiments of the invention and shown some of the possible uses of the invention, it should be understood that the invention is not limited by this disclosure but may be modified and used in different ways to meet varying conditions without departure from the spirit and scope of the invention as hereinafter broadly claimed.

What we claim is:

1. A ceiling outlet fixture, outlet box or fitting for overhead electrical distribution systems having its lower end open for the drawing of the wires at the ceiling and both internally and externally screw threaded, an internally screw threaded collar adapted for mounting on the form of a ceiling slab and engaged over the externally screw threaded lower end of the fitting to support the fitting on the form with a capability of rotary and vertical adjustments of the fitting and a ceiling plate providing a finish between the ceiling and the open end of the fitting, said plate having an externally screw threaded neck portion engageable with the internally screw threaded portion of the fitting to properly join the fitting and ceiling irrespective of the adjustment provided by the supporting collar between the fitting and ceiling slab.

2. A ceiling outlet fixture, outlet box or fitting for overhead electrical distribution systems having its lower end open for the drawing of the wires at the ceiling and provided with attaching means both at the inside and the outside of said open lower end, a supporting collar for mounting on a ceiling form having attaching means complemental to the external attaching means and relatively adjustable in respect thereto, whereby to enable an adjustable mounting of the fitting upon the ceiling form and a ceiling plate having a wide flange engageable with the ceiling and attaching means complemental and relatively adjustable to the internal attaching means of the fitting to thereby enable the seating of said plate to the ceiling irrespective of adjustments of the fitting to the ceiling form.

3. A ceiling outlet fixture, outlet box or fitting for overhead electrical distribution systems having its lower end open for the drawing of the wires at the ceiling and provided with attaching means both at the inside and the outside of said open lower end, a supporting collar for mounting on a ceiling form having attaching means complemental to the external attaching means and relatively adjustable in respect thereto, whereby to enable an adjustable mounting of the fitting upon the ceiling form and a ceiling plate having a wide flange engageable with the ceiling and attaching means complemental and relatively adjustable to the internal attaching means of the fitting to thereby enable the setting of said plate to the ceiling irrespective of adjustments of the fitting to the ceiling form, said fitting being open at the top and means for holding different forms of wiring conduit interchangeably engageable over said open top of the fitting for enabling the use of different types of conduit with the same fitting.

4. In combination, a ceiling and floor slab having a wire raceway therein and ceiling and floor outlet fixtures, boxes or fittings in the slab interposed in and open to said raceway, having ceiling outlets at the bottom open to the ceiling, and floor outlets at the top open to the floor and thereby enabling the wiring to be extended from said raceway out through selected portions of either the ceiling or the floor or from ceiling to floor or vice versa.

5. In electrical distribution, an outlet fitting for installation in a combined floor and ceiling slab, comprising a box structure open at the top for admission of the wiring and open at the bottom to form a ceiling outlet, a box member mounted over said ceiling outlet member open at the bottom to said ceiling outlet and open at the top to form a floor outlet, ceiling and floor fittings for said ceiling and floor outlets, one of the members of said combined fitting being open at the side for a wire raceway.

6. In combination, a ceiling and floor slab, a wiring conduit embedded therein and a combination ceiling and floor outlet fixture outlet box or fitting open to said conduit and having a ceiling outlet in the bottom of the same open to the ceiling and a floor outlet in the top of the same open to the floor whereby the wiring may be extended from the conduit out through either the ceiling or the floor or may extend directly from ceiling to floor, or vice versa.

7. In combination, a ceiling and floor slab, a wiring conduit embedded therein and accessible from below for providing ceiling outlets and a combination ceiling and floor outlet fixture outlet box or fitting in communication with said conduit having cover plates accessible at top and bottom of the same for drawing the wires of the conduit system either at the floor or at the ceiling.

8. In combination, a ceiling and floor slab, a conduit embedded in said slab and accessible along the length of the same from both the ceiling and the floor levels for the drawing of the wires of the system and outlet fixtures, boxes or fittings at predetermined points in the conduit opening to both the ceiling and to the floor.

9. In combination, a ceiling and floor slab, a conduit embedded in said slab and accessible along the length of the same from both the ceiling and the floor levels for the drawing of the wires of the system, outlet fixtures, boxes or fittings at predetermined points in the conduit opening to both the ceiling and to the floor and other outlet fixtures in the conduit opening only to the ceiling.

10. In combination, a ceiling and floor slab, a half-round conduit embedded therein, outlet fixtures, boxes or fittings opening up into said conduit from the ceiling level of the slab and other outlet fixtures opening down into said conduit from the floor level of the slab.

11. In combination, a ceiling and floor slab, a half-round conduit embedded therein, outlet fixtures, boxes or fittings opening up into said conduit from the ceiling level of the slab and other outlet fixtures opening down into said conduit from the floor level of the slab, certain of the said floor outlet fixtures being directly over ceiling outlet fixtures and other of the floor outlet fixtures being offset with respect to ceiling outlet fixtures to enable the drawing and the splicing of the conduit wires from both floor and ceiling in a variety of ways.

12. As an article of manufacture, an outlet fitting for wire raceways comprising a generally funnel shaped box structure open at the bottom to afford a ceiling outlet and having a wide opening at the top to afford free communication with the wire raceway, said fitting having portions in a plane substantially at right angles to the axis of the fitting about its larger open upper end forming attaching means for interchangeable conduit connecting devices and provided with screw seats for attachment screws used in the securing of such conduit connecting devices.

13. A flexible combined ceiling and floor outlet electrical distribution system comprising in combination with a ceiling and floor slab having a continuous over-size wire raceway therein, accessible throughout its length from both the floor and the ceiling side of the slab to enable its being tapped at any points in its length from either the ceiling or the floor and having at predetermined points therein outlets to the floor and outlets to the ceiling whereby circuit wires may be fished through said raceway either from above or from below to the points at which the raceway may be tapped.

14. A flexible combined ceiling and floor outlet electrical distribution system comprising a continuous over-size wiring conduit accessible throughout its length from either above or below, ceiling outlet boxes or fittings open at the top to the full interior of said wiring conduit and open at the bottom to provide ceiling outlets for the wiring in the raceway or wiring entered into the raceway at points where the raceway has been tapped from above or below, and floor outlet boxes or fittings opening into the full interior of the conduit at the lower ends and open at the top to form floor outlets for extension of the wiring in the conduit, or the fishing of wiring from the floor to the ceiling side or vice versa or the fishing of wiring to the tapped outlets at either the floor or the ceiling.

15. In electrical distribution, an outlet fitting for installation in a ceiling slab comprising a box structure open at the top for admission of the wiring and open at the bottom to form a ceiling outlet and covers for holding different forms and shapes of wiring conduit and interchangeably engageable over said open top of the fitting for adapting the fitting to various kinds of conduit systems.

16. The herein disclosed process, of flexible electrical distribution, which comprises the provision of an oversize wiring raceway in a combined floor and ceiling slab capable of freely carrying a considerably greater number of wires than would ordinarily be required in a non-flexible wiring system, installing with said raceway at predetermined points in the length of the same, outlet fittings open to the ceiling and outlet fittings opening to the floor, and thereafter entering said raceway from the floor level and from the ceiling side of the slab at points intermediate the initially installed floor and ceiling outlets and fishing the wiring either from above or from below the slab through the initially installed outlets to the intermediate points at which the raceway is tapped.

In witness whereof, we have hereunto set our hands this 28th day of December, 1923.

HARRY S. ARNOLD.
RAY C. WILSON.